United States Patent [19]
Yamaguchi

[11] Patent Number: 5,434,989
[45] Date of Patent: Jul. 18, 1995

[54] CACHE MEMORY FOR EFFICIENT ACCESS WITH ADDRESS SELECTORS

[75] Inventor: Seiji Yamaguchi, Osaka, Japan

[73] Assignee: Matsushita Electric Industrial Co., Ltd., Osaka, Japan

[21] Appl. No.: 323,528

[22] Filed: Oct. 11, 1994

Related U.S. Application Data

[63] Continuation of Ser. No. 837,388, Feb. 19, 1992, abandoned.

[30] Foreign Application Priority Data

Feb. 19, 1991 [JP] Japan ............... 3-024690

[51] Int. Cl.$^6$ ............ G06F 12/00; G06F 12/08; G06F 13/00
[52] U.S. Cl. .................. 395/400; 395/425; 364/228 D; 364/228.1; 364/242.91; 364/243.41
[58] Field of Search ............. 395/400, 425, 375

[56] References Cited

U.S. PATENT DOCUMENTS

| | | | |
|---|---|---|---|
| 5,056,002 | 10/1991 | Watanabe | 395/425 |
| 5,133,058 | 7/1992 | Jensen | 395/400 |
| 5,195,089 | 3/1993 | Sindhu et al. | 370/85.1 |
| 5,226,130 | 7/1993 | Favor et al. | 395/425 X |
| 5,228,135 | 7/1993 | Ikumi | 395/425 |
| 5,247,649 | 9/1993 | Bandoh | 395/425 |

OTHER PUBLICATIONS

J. Archibald et al., *Cache Coherence Protocols: Evaluation Using A Multiprocessor Simulation Model*, ACM Trans. On Computer Systems, vol. 4, No. 4, pp. 273-298 (Nov. 1986).

*Primary Examiner*—Jack B. Harvey
*Assistant Examiner*—Michael A. Whitfield
*Attorney, Agent, or Firm*—Willian Brinks Hofer Gilson & Lione

[57] ABSTRACT

A cache memory device including first and second address selectors and a control device for controlling the selection of two addresses out of four types of addresses. The four address types are instructions addresses successively generated by an increment of a program counter, a branch address for instruction fetch in a branch target based on a conditional branch instruction or the like, a data address for data access based on load instruction or store instruction, and a physical address for regulating data consistency between the cache memory device and other memory devices. A first memory array for storing tag addresses and a second memory array for storing instructions and data have two ports to access two selected addresses received from the first and second address selectors independently. Accordingly, access penalties by an RISC microprocessor are reduced in a processor unit in a multiprocessor system.

8 Claims, 8 Drawing Sheets

F I G.1
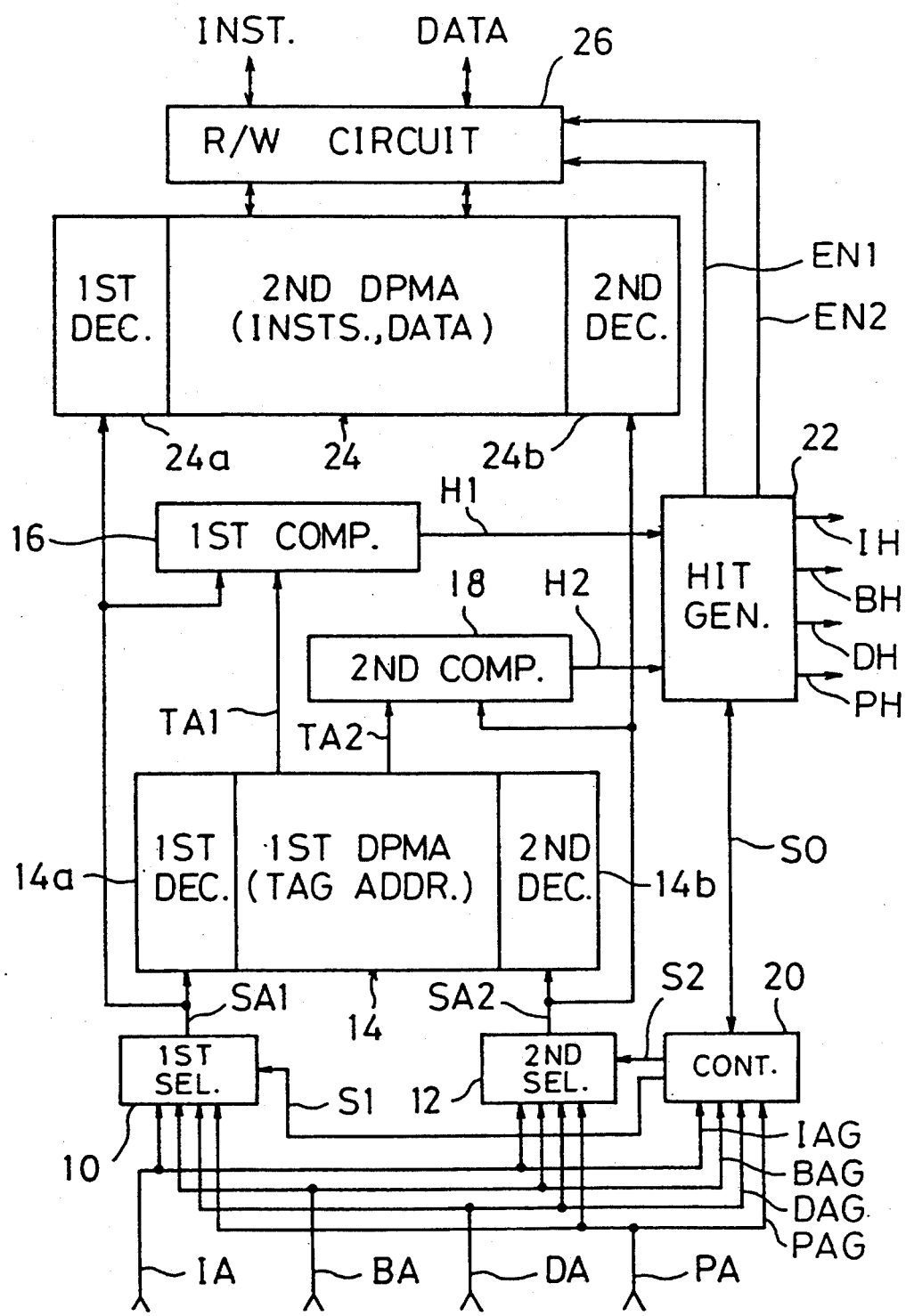

CACHE MEMORY FOR EFFICIENT ACCESS WITH ADDRESS SELECTORS

This is a continuation divisional application of application Ser. No. 07/837,388 filed Feb. 19, 1992 now abandoned.

BACKGROUND OF THE INVENTION

This invention relates to a cache memory device storing both instructions and data.

In a computer system, a cache memory device is employed for the purpose of high-speed accesses for instruction fetch and for data access.

A cache memory of this kind is used as a data cache for storing data in addition to as an instruction cache in which instructions to be executed by a processor are stored. Though the cache memory device of this type can optimize capacity distribution between the instructions and data according to an application program, conventionally, an access requirement for instruction fetch and a data access requirement cannot be processed simultaneously because of a single port memory array thereof.

A type of cache memory device in which instruction cache and data cache are separated is also used. Though this type of cache memory device can process the access requirement for instruction fetch and data access requirement simultaneously, plural access requirements for instruction fetch cannot be processed simultaneously and plural data access requirements cannot be processed simultaneously because of the conventional single port memory array of the instruction cache and data cache.

In the computer system with a microprocessor construction, there are some cases, for executing an instruction, employing a microprocessor with an architecture of reduced instruction set computer (hereinafter referred to as RISC microprocessor). In the RISC microprocessor, an instruction set is fundamentally limited to instructions which can be executed in one cycle, thus the microprocessor executes the instructions successively every cycle. Also, a memory access instruction is limited to two kinds, for example, load instruction and store instruction.

In a processor unit in which the RISC microprocessor is connected with the cache memory device via an internal bus, the RISC microprocessor gives the cache memory device an instruction address to be successively generated by an increment of a program counter for instruction fetch and a data address to be generated for the data access based on load instruction and store instruction as respective access requirement addresses. When the microprocessor executes a sequence change instruction which requires a change in the instruction executing sequence, i.e., unconditional branch instruction, conditional branch instruction or the like, a branch address for instruction fetch in a branch target is given to the cache memory device as another access requiring address.

On the other hand, in a computer system with a multiprocessor construction in which a common system bus (external bus) is connected with plural processor units, each processor unit is generally provided with a bus supervisory device. For example, when data of the cache memory device in a processor unit is partially rewritten, it is necessary to invalidate data of the same address of the cache memory device in the other processor units according to a definition of cache protocol in order to maintain data consistency, i.e., coherency. Also, when the data of a common external memory device connected with the external bus is partially rewritten, the same operation is required. At the time, each bus supervisory device checks whether the cache memory device retains the data of a physical address supplied from the external bus. In other words, the bus supervisory device gives the physical address for regulating the data consistency as another access requiring address to the cache memory device. The coherency of the cache memory device in the multiprocessor system is referred to in J. Archibanld and J. L. Baer: "Cache Coherence Protocols: Evaluation Using a Multiprocessor Simulation Model" (ACM Trans. on Computer Systems, Vol. 4, No. 4, November 1986, pp. 273–298).

Each access requirement for instruction address, branch address, data address and physical address occurs independently. Therefore, four types of access requirements may occur simultaneously at the most.

With the conventional cache memory device in which the instruction cache and data cache are not separated, however, since the access requirement for instruction fetch (access requirement for instruction address or branch address) and data access requirement (access requirement for data address or physical address) cannot be processed simultaneously, one of the access requirements must be processed first when both requirements simultaneously occur. Accordingly, when the access for instruction fetch is processed first, for example, the data access requirement is in a wait state to cause a penalty.

In the conventional cache memory device in which the instruction cache and data cache are separated, there problems arise as described below upon an execution of, for example, conditional branch instruction or memory access instruction, particularly in the case applied to the RISC microprocessor supporting the multiprocessor system.

Under a construction that during the RISC microprocessor judges whether conditions of the conditional branch instruction are met in parallel with the execution of one instruction, the cache memory device processes the access requirement for instruction address from the processor, the instruction to be executed next is fetched beforehand according to a program counter when the branch conditions are not met, thus the processor can execute the next instruction immediately after it is judged that the branch conditions are not met. Since, however, the conventional cache memory device cannot simultaneously process the access requirement for instruction address and the access requirement for branch address, the branch instruction can be fetched only after the judgment of the branch conditions and process of the access requirement for instruction address are terminated. In other words, a penalty because of access for the branch instruction fetch is caused.

In addition, the conventional cache memory device in which the instruction cache and data cache are separated cannot simultaneously process the access requirement for data address based on load instruction and store instruction and the requirement for physical address for regulating the data consistency, thus one of the access requirements must be processed first upon a simultaneous occurrence thereof. Accordingly, when, for example, the access requirement for physical address is processed first, the access requirement for data address is in the wait state causing a penalty.

It is an object of the present invention to provide a cache memory device, in which instruction cache and data cache are not separated, capable of simultaneously processing at least two access requirements selected at random out of plural access requirements for instruction fetch and plural data access requirements, particularly to provide a cache memory device suitably applied to each processor unit of the multiprocessor construction including the RISC microprocessor with high access efficiency.

SUMMARY OF THE INVENTION

To attain the above object, in the present invention, dual port memory arrays having two independent ports are introduced to the cache memory device in which instruction cache and data cache are not separated for realizing simultaneous processing of two access requirements for instruction fetch and two access requirements for data.

In detail, in the present invention, a cache memory device to which at least one address an address group, composed of plural addresses to be used for instruction fetch and plural addresses to be used for data access, is given as an access requiring address comprises plural address selecting means, for selecting two addresses out of the given plural access requiring addresses when plural access requiring addresses are simultaneously given and memory means, for storing instructions and data and being independently accessed by each address selected by the plural address selecting means.

Under the above construction, in addition to the case where the plural address selecting means select an address for instruction fetch and another address for data access, there are two cases where they select plural addresses for instruction fetch and where they select plural addresses for data access. The memory means storing instructions and data is accessed according to the respective cases by independent addresses selected by each address selecting means. Consequently, it is possible to simultaneously process at least two access requirements optionally selected out of the plural access requirements for instruction fetch and the plural access requirements for data access. Further, since the instruction cache and the data cache are not separated, memory capacity distribution is optimized between the instructions and data according to an application program.

Specifically, in order to apply to a processor unit of the multiprocessor system including the RISC microprocessor, the cache memory device to which at least one address belonging to an address group composed of four types of addresses is given as access requiring address comprises a control device, first and second address selectors and a memory device. The four types of addresses are an instruction address type as a first address successively generated by an increment of a program counter for instruction fetch, a branch address as a second address type generated for instruction fetch in a branch target based on a sequence change instruction requiring a sequence change of the instruction execution, a data address type as a third address generated for data access based on a memory access instruction, and a physical address type for data access as a fourth address for regulating the data consistency between the cache memory device and the other memory devices. The control device specifies, when plural access requiring addresses are simultaneously given, two addresses as first and second selected addresses respectively out of the given plural access requiring addresses. The first address selector selects the address specified as the first selected address by the control device out of the given plural access requiring addresses and outputs the selected address. The second address selector selects the address specified as the second selected address by the control device out of the given plural access requiring addresses and outputs the selected address. The memory device stores instructions and data and is accessed by independent addresses output from the respective first and second address selectors.

Under the above construction, although the instruction cache and data cache are not separated, the access requirement for instruction fetch (access requirement for instruction address or branch address) and data access requirement (access requirement for data address or physical address) can be simultaneously processed. In addition, it is possible to simultaneously process two access requirements for instruction fetch (access requirement for instruction address and branch address) or two data access requirements (access requirement for data address and physical address), which is conventionally impossible even in a cache memory device in which instruction cache and data cache are separated. Further, there are six types of address combinations of two addresses as first and second selected addresses specified by the control device, namely, (1) instruction address and branch address, (2) instruction address and data address, (3) instruction address and physical address, (4) branch address an d data address, (5) branch address and physical address and (6) data address and physical address, which are necessary address combinations for applying to the processor unit of the multiprocessor including RISC microprocessor. The other combinations necessary for use with a microprocessor with an architecture of superscalar type capable of simultaneously executing plural instructions in one cycle for example, a combination of two data addresses) can be specified.

Since the two access requirements for both the instruction address and branch address can be simultaneously processed, it is possible to simultaneously fetch the next instruction to be executed when conditions of a conditional branch instruction are not met and the next instruction to be executed when the conditions of the conditional branch instruction are met. In other words, the RISC microprocessor can select and execute the next instruction at the time the branch conditions is judged, and can execute instructions successively every cycle regardless of the conditions being met or not met. Since the access requirements for instruction address and for data address can be simultaneously processed, the instruction fetch and data access can be performed without penalty as far as the cache memory device hits, though the RISC microprocessor executes successive memory access instructions. Since the physical address for regulating the data consistency is acceptable, it is possible to apply it to the multiprocessor. Consequently, the cache memory device of the present invention is suitable for each processor unit of the multiprocessor system including the RISC microprocessor with high access efficiency, enhancing processability of the computer system as a whole. Since the two access requirements for data address (two data access requirements based on each of two memory accesses) can be processed simultaneously, it can be applied to the microprocessor with an architecture of superscalar type which can simultaneously execute plural instructions in one cycle.

It is preferable that the control device specifies one address as the first selected address out of the first to third types of addresses of the given plural access requiring addresses, and specifies another address as the second selected address out of the second to fourth types of addresses thereof. Under such the construction, though the range of specifying the first and the second selected addresses by the control device is limited, the six address combinations which are necessary for applying to the processor unit of the multiprocessor system including the RISC microprocessor is acceptable, similarly to a case without the limitation. The combinations of two data addresses or the like which are necessary for applying to the microprocessor with an architecture of superscalar type are also acceptable. Thus, the construction of the hardware is simplified, obtaining the same effects as the case without the limitation of the specifying range.

It is preferable that when three or more access requiring addresses are given simultaneously, the control device specifies the first and second selected addresses according to a priority rule which precedes the first and second address type with the third and fourth address types and precedes the fourth address type with the third address type and the control device places in a wait state the address type not specified as the first and second selected addresses of the three or more given access requiring addresses. Under such a construction, even when, for example, the four access requirements for each of first to fourth address types are simultaneously given, a penalty because of the access requirement for instruction fetch is prevented, and the instructions are supplied to the RISC microprocessor per cycle without obstruction by the data access. Since the access requirement for physical address (fourth address type) is preceded with that for data address (third address type), an operation for avoiding retention of contradictory data can be performed at an earlier stage.

It is preferable that when two or more access requiring addresses are given simultaneously in addition to the access requiring address in the wait state, the access requiring address in the wait state has a highest priority at the specification of the first and second selected addresses. Under such a construction, for example, three access requirements are given simultaneously, the access requirement in the wait state of the three access requirements is processed next time without failure. When four access requirements are simultaneously given the two access requirements in the wait state of the four access requirements are processed next without failure. Consequently, minimum penalty is caused for the access requirements for any of the first to fourth types of addresses.

Preferably, the memory device includes first and second dual port memory arrays and first and second comparators. The first dual port memory array has first and second independent ports. A specific part of the address Output from the first address selector reads out a first tag address from the first port and a specific part of the address output from the second address selector reads out a second tag address from the second port. The first comparator outputs a first hit signal when another specific part of the address output from the first address selector conforms with the first tag address read out from the first port of the first dual port memory array. The second comparator outputs a second hit signal when another specific part of the address output from the second address selector conforms with the second tag address read out from the second port of the first dual port memory array. The second dual port memory array stores instructions and data and has first and second independent memory ports. The address output from the first address selector accesses the second dual port memory array via the first memory port when the first comparator outputs the first hit signal. The address output from the second address selector accesses the second dual port memory array via the second memory port when the second comparator outputs the second hit signal.

Under the above construction, the second dual port memory array stores both instructions and data and the first dual port memory array stores tag addresses of entries of the second dual port memory array. The first dual port memory array and the first comparator check whether the address output from the first address selector hits, then the output address is accessed to the second dual port memory array when there is a hit. In parallel therewith, the first dual port memory array and the second comparator check whether the address output from the second address selector hits, then the output address is accessed to the second dual port memory array when there is a hit. Thus, even though the instruction cache and data are not separated, it is possible to simultaneously access instruction and data, two instructions, or two pieces of data. In addition, the capacity distribution between the instructions and data is optimized according to the application program.

Preferably, at least two successive instructions of the stored instructions are fetched at once from the memory device in every access by the first address. Accordingly, an access frequency regarding the first address is reduced and possibility of immediate processing of the access requirements for the second to fourth addresses is increased, preventing a penalty.

BRIEF DESCRIPTION OF THE DRAWING

FIG. 1 is a block diagram showing a construction of a cache memory device according to an embodiment of the present invention;

PREFERRED EMBODIMENT OF THE PRESENT INVENTION

Figure 2:
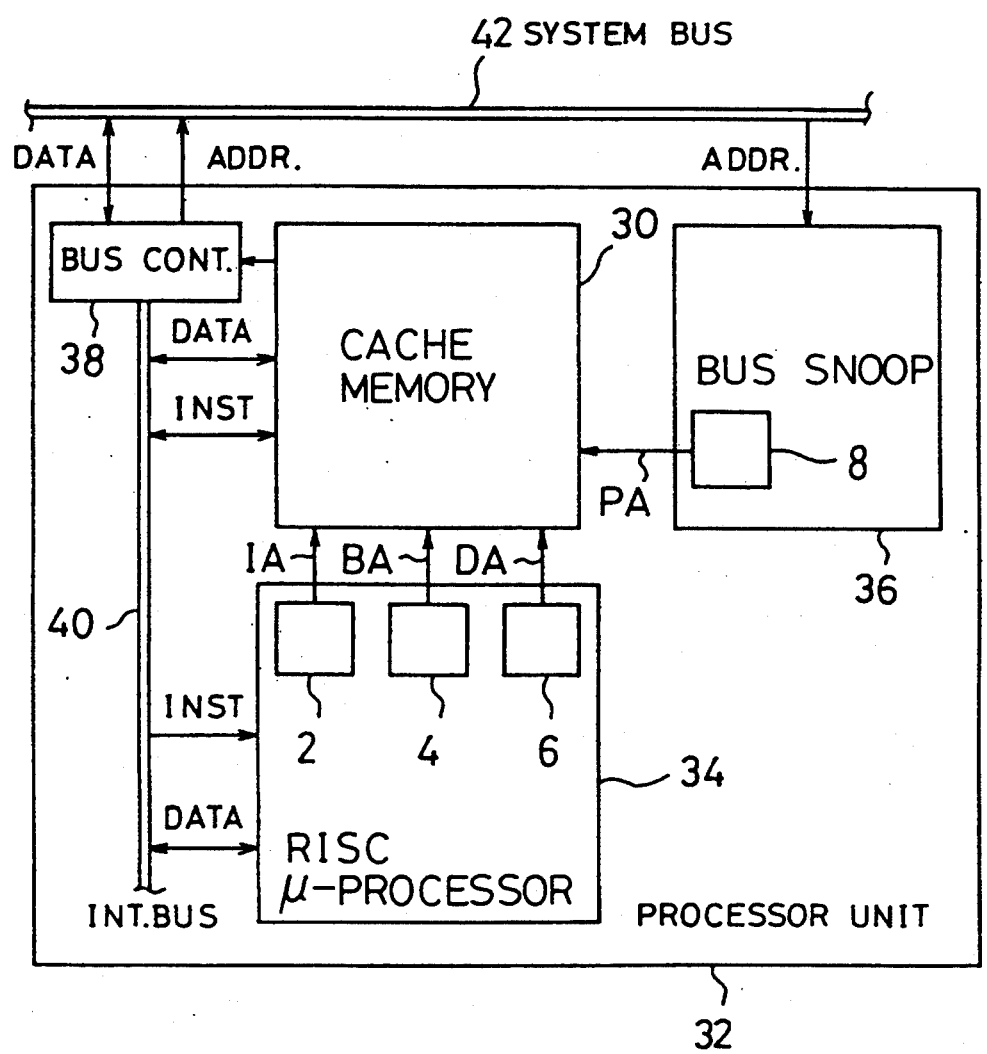
FIG. 2 is a block diagram showing an example of a processor unit in which the cache memory device in FIG. 1 is built.

A description is made below about the present invention based on accompanying drawings.

FIG. 1 is a block diagram showing a construction of a cache memory device suitable for a processor unit of a multiprocessor system including an RISC microprocessor according to an embodiment of the present invention. The cache memory device in FIG. 1 receives at least one address of four types of addresses IA, BA, DA, PA as an access requiring address. The first type IA given with a first access requiring signal IAG is an instruction address successively generated by an increment of a program counter for instruction fetch. The second type BA given with a second access requiring signal BAG is a branch address generated for a branch instruction fetch based on a sequence change instruction such as unconditional branch instruction, conditional branch instruction. The third type DA given with a third access requiring signal DAG is a data address generated for data access based on a memory access instruction. The fourth address type PA given with a fourth access requiring signal PAG is a physical address for data access for regulating data consistency among other memory devices.

A reference numeral 20 in FIG. 1 designates a control device as a kind of state machine for outputting first and second specifying signals S1, S2 according to a combination among the first to fourth access requiring signals IAG, BAG, DAG, PAG as input signals, as indicated in tables 1 and 2. The first specifying signal is a signal for specifying as a first selected address one address of the first to fourth address types IA, BA, DA, PA as the access requiring addresses. The second specifying signal S2 is a signal for specifying as the second selected address another address of the first to fourth address types IA, BA, DA, PA as the access requiring addresses. Wherein, it is exchangeable in each other to specify the selected address by the first and second specifying signals S1, S2 indicated in tables 1 and 2. A reference S0 in FIG. 1 designates another signal output from the control device 20 for transmitting both specification.

TABLE 1

| No. | INPUT | | | | OUTPUT | |
|-----|-----|-----|-----|-----|-----|-----|
|     | IAG | BAG | DAG | PAG | S1  | S2  |
| 1   | 0   | 0   | 0   | 0   | —   | —   |
| 2   | 1   | 0   | 0   | 0   | IA  | —   |
| 3   | 0   | 1   | 0   | 0   | BA  | —   |
| 4   | 0   | 0   | 1   | 0   | DA  | —   |
| 5   | 0   | 0   | 0   | 1   | PA  | —   |
| 6   | 1   | 1   | 0   | 0   | IA  | BA  |
| 7   | 1   | 0   | 1   | 0   | IA  | DA  |
| 8   | 1   | 0   | 0   | 1   | IA  | PA  |
| 9   | 0   | 1   | 1   | 0   | BA  | DA  |
| 10  | 0   | 1   | 0   | 1   | BA  | PA  |
| 11  | 0   | 0   | 1   | 1   | DA  | PA  |

TABLE 2

| No. | INPUT | | | | OUTPUT | | NEW WAIT STATE |
|-----|-----|-----|-----|-----|-----|-----|-----|
|     | IAG | BAG | DAG | PAG | S1  | S2  |     |
| 12  | 1*  | 1   | 1   | 0   | IA  | BA  | DA  |
| 13  | 1   | 1*  | 1   | 0   | BA  | IA  | DA  |
| 14  | 1   | 1   | 1*  | 0   | DA  | IA  | BA  |
| 15  | 1   | 1   | 1   | 0   | IA  | BA  | DA  |
| 16  | 1*  | 1   | 0   | 1   | IA  | PA  | BA  |
| 17  | 1   | 1*  | 0   | 1   | BA  | PA  | IA  |
| 18  | 1   | 1   | 0   | 1*  | PA  | IA  | BA  |
| 19  | 1   | 1   | 0   | 1   | IA  | BA  | PA  |
| 20  | 1*  | 0   | 1   | 1   | IA  | PA  | DA  |
| 21  | 1   | 0   | 1*  | 1   | DA  | PA  | IA  |
| 22  | 1   | 0   | 1   | 1*  | PA  | IA  | DA  |
| 23  | 1   | 0   | 1   | 1   | IA  | PA  | DA  |
| 24  | 0   | 1*  | 1   | 1   | BA  | PA  | DA  |
| 25  | 0   | 1   | 1*  | 1   | DA  | PA  | BA  |
| 26  | 0   | 1   | 1   | 1*  | PA  | BA  | DA  |
| 27  | 0   | 1   | 1   | 1   | BA  | PA  | DA  |
| 28  | 1*  | 1*  | 1   | 1   | IA  | BA  | DA, PA |
| 29  | 1*  | 1   | 1*  | 1   | IA  | DA  | BA, PA |
| 30  | 1*  | 1   | 1   | 1*  | IA  | PA  | BA, DA |
| 31  | 1   | 1*  | 1*  | 1   | BA  | DA  | IA, PA |
| 32  | 1   | 1*  | 1   | 1*  | BA  | PA  | IA, DA |
| 33  | 1   | 1   | 1*  | 1*  | DA  | PA  | IA, BA |
| 34  | 1*  | 1   | 1   | 1   | IA  | PA  | BA, DA |
| 35  | 1   | 1*  | 1   | 1   | BA  | PA  | IA, DA |
| 36  | 1   | 1   | 1*  | 1   | DA  | PA  | IA, BA |
| 37  | 1   | 1   | 1   | 1*  | PA  | IA  | BA, DA |
| 38  | 1   | 1   | 1   | 1   | IA  | BA  | DA, PA |

The control device 20 outputs the first and second specifying signals S1 and S2 according a priority rule where the first and second address types IA, BA are preceded the third and fourth address types DA, PA and the fourth address type PA precedes the third address type DA when at least three access requiring signals are given simultaneously, as shown in table 2. The other access requiring addresses which are not specified are in a wait state as, for example, the physical address PA (fourth address type) indicated in number 19 in table 2. In table 2, numeral 1 means a physical value and 1* means the access requiring signal for an address in the wait state. Where two or more access requiring signals are simultaneously given in addition to the access requiring signal in the wait state (for example, number 22 in table 2), the control device 20 outputs the specifying signal of the access requiring signal in the wait state prior to the specification of the first and second selected addresses.

A reference numeral 10 in FIG. 1 designates a first address selector for selecting the addresses specified as the first selected address by the first specifying signal S1 out of the first to fourth address types IA, BA, DA, PA and for outputting the selected address as the first selected address SA1. A second address selector 12 selects the address specified as the second selected address by the second specifying signal S2 out of the first to fourth address types IA, BA, DA, PA and outputs the selected address as the second selected address SA2.

A memory part is composed of first and second dual port memory arrays 14, 24, first and second comparators 16, 18, a hit signal generator 22 and read/write circuit 26 so as to be accessed by the first and second selected addresses SA1, SA2 independently.

The first dual port memory array 14 has first and second address decoders 14a, 14b and two independent ports. In the dual port memory array 14, a lower bit of the first selected address SA1 reads out a first tag address TA1 and a lower bit of the second selected address SA2 reads out a second tag address TA2 in parallel therewith. The first comparator 16 compares an upper bit of the first selected address SA1 with the first tag address TA1 and outputs a first hit signal H1 when they conform with each other. In parallel therewith, the second comparator 18 compares an upper bit of the second selected address SA2 with the second tag address TA2 and outputs a second hit signal H2 when they conform with each other.

The hit signal generator 22 outputs a first control signal EN1 upon receiving the first hit signal Hi and outputs a second control signal EN2 upon receiving the second hit signal H2. The hit signal generator 22 generates each cache hit signal of instruction cache hit IH, branch hit BH, data cache hit DH and bus supervisory hit PH according to the hit address, while communicating with the control device 20.

The second dual port memory array 24 includes first and second address decoders 24a, 24b and two independent memory ports and stores both instructions and data. The read/write circuit 26 receives the first and second control signals EN1, EN2 from the hit signal generator 22 and executes a parallel access to the second dual port memory array 24. In detail, the second dual port memory array 24 is accessed by the first selected address SA1 when the first comparator 16 detects a hit of the first selected address SA1 and, in parallel therewith, accessed by the second selected address SA2 when the second comparator 18 detects a hit of the second selected address SA2.

The first dual port memory array 14 stores information on the tag address of entries of the second dual port memory array 24 and the like. The first comparator 16 checks whether the first selected address SA1 from the first address selector 10 hits based on the first tag address TA1 from the first dual port memory array 14. When there is a hit, the first selected address is used to access the second dual port memory array 24. In parallel therewith, the second comparator 18 checks whether the second selected address SA2 from the second address selector 12 hits based on the second tag address TA2 from the first dual port memory array 14. When there is a hit, the second selected address is used to access the second dual port memory array 24. The hit signal generator 22 outputs the cache hit signals IH, BH, DH, PH corresponding to the hit address.

As shown in FIG. 2, cache memory device 30 with the above construction is built in, for example, a processor unit 32 including an RISC microprocessor 34. The cache memory device 30 and the RISC microprocessor 34 are respectively connected with an internal bus 40 connected to a system bus (external bus) 42 via a bus control device 38. The RISC microprocessor 34 includes three address generators 2, 4, 6 for giving to the cache memory device 30 the instruction address (first address type) IA, the branch address (second address type) BA and data address (third address type) DA together with the first to third access requiring signals IAG, BAG, DAG. The processor unit 32 further includes a bus supervisory device 36 for receiving the address from the system bus 42. The bus supervisory device 36 has a transmitter 8 for giving the physical address (fourth address type) PA to the cache memory device 30 together with the fourth access requiring signal PAG.

Figure 3:
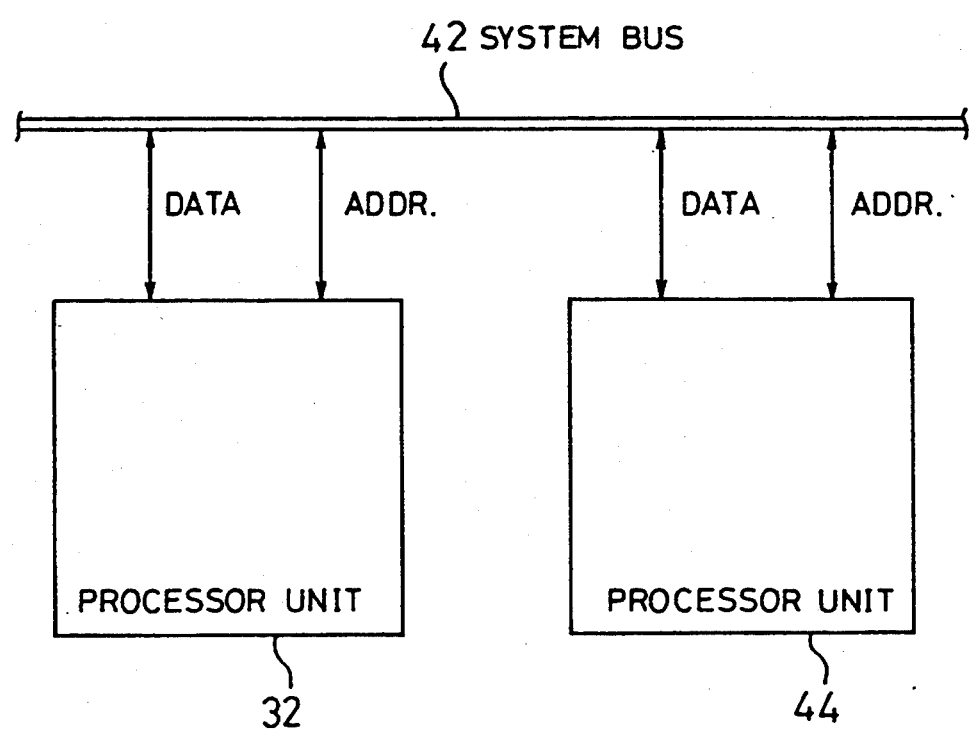
FIG. 3 is a block diagram showing an example of a computer system with a multiprocessor construction in which the plural processor units in FIG. 2 are connected with a common system bus.

As shown in FIG. 3, the processor unit 32 with the above construction is connected with another processor unit 44 with the same construction or a common external memory device (not shown in the drawing) via the system bus 42. In the computer system with such a multiprocessor, when data of the cache memory device in one of the processor unit 44 is partially rewritten, it is necessary to invalidate data of the same address in the cache memory device 30 in the other processor unit 32. The bus supervisory device 36 provided in the processor unit 32 checks whether the cache memory device 30 retains the data on the physical address PA supplied from the system bus 42.

Operation of the cache memory device 30 having the construction in FIG. 1 is described below with reference to FIGS. 4–7. Wherein, the following points are premised for convenience sake: each instruction constructing the instructions stored in the cache memory device 30 has a fixed length of 4 bytes; two instructions are fetched at once by the instruction address (first address type) IA from the RISC microprocessor 34; and the RISC microprocessor 34 executes one instruction per cycle.

Figure 4:
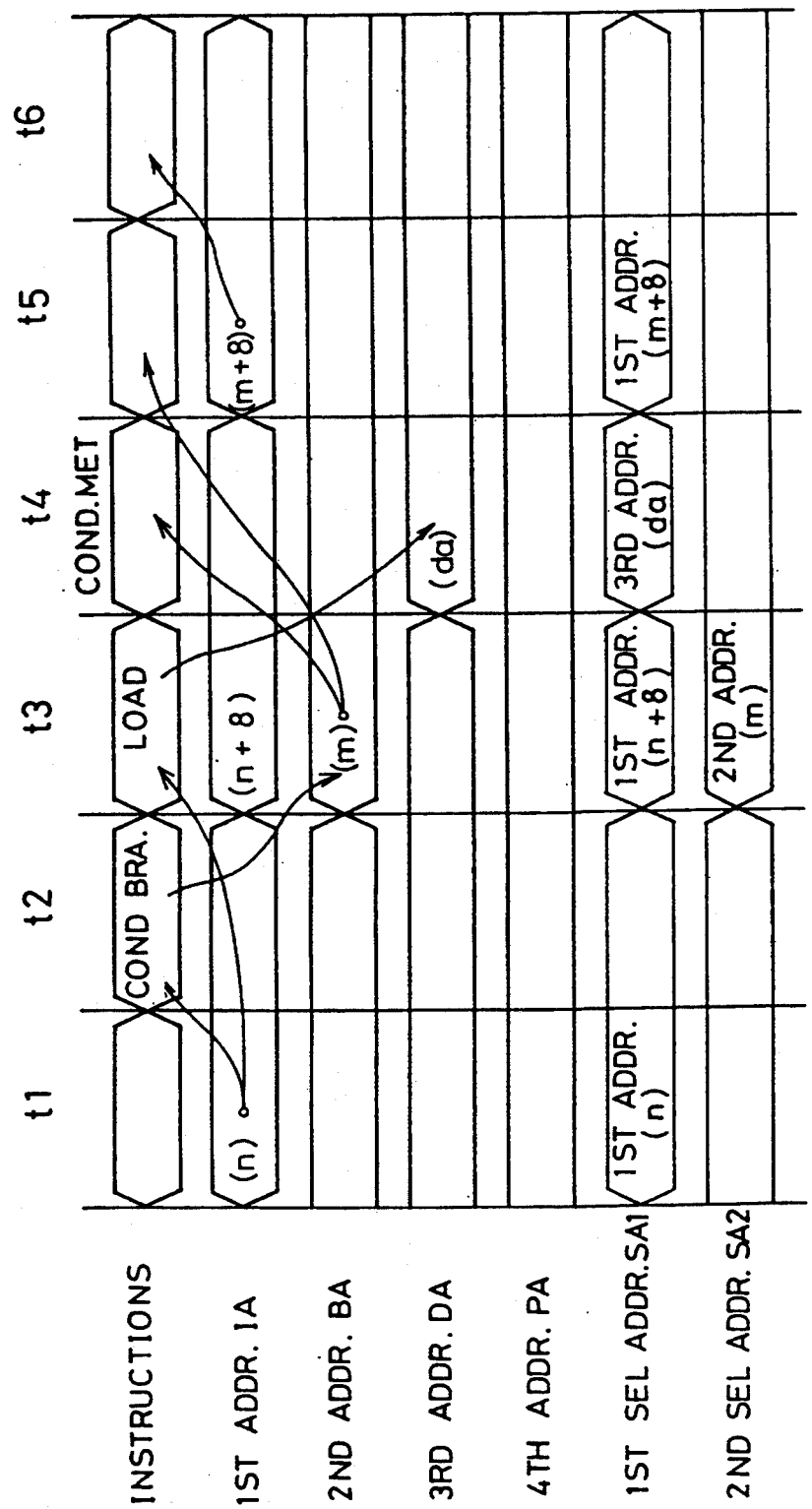
FIG. 4 through to FIG. 7 are respectively timing charts showing an operation of the cache memory device in FIG. 1.

FIG. 4 is a timing chart showing an example of simultaneous occurrence of the access requirement for the instruction address (first address type) IA and that for the branch address (second address type) BA (cycle t3).

In FIG. 4, the cache memory device 30 receives the instruction address (first address type) IA=(n) generated by the increment of the program counter in the RISC microprocessor together with the first access requiring signal IAG at cycle t1. Receiving them, the control device 20 specifies the instruction address IA as the first selected address by outputting the first specifying signal S1 as indicated in number 2 in table 1. The first address selector 10 outputs the instruction address IA as the first selected address SA1. Thus, the conditional branch instruction and load instruction are fetched at once from the second dual port memory array 24 by the first selected address SA1.

At cycle t2, the RISC microprocessor 34 executes a conditional branch instruction of the two instructions fetched at the cycle t1.

At cycle t3, the RISC microprocessor 34 judges whether conditions of the conditional branch instruction are met in parallel with the execution of the load instruction of the two instructions fetched at the cycle t1, the cache memory device 30 receives the instruction address (first address type) IA=(n+8) generated by the increment of the program counter and the branch address (second address type) BA=(m) calculated based on the conditional branch instruction simultaneously from the RISC microprocessor 34 together with the first and second access requiring signals IAG, BAG. Receiving them, the control device 20 specifies the instruction address IA as the first selected address by outputting the first specifying signal S1, as indicated in number 6 in table 1, and specifies the branch address BA as the second selected address by outputting the second specifying signal S2. While the first address selector 10 outputs the instruction address IA as the first selected address SA1, the second address selector 12 outputs the branch address BA as the second selected address SA2. In other words, two instructions to be executed next if the conditions of the conditional branch instruction are not met and two instructions to be executed next if the branch conditions are met are both fetched simultaneously. Then, the RISC microprocessor 34 selects one of the two fetched address instructions to be executed next depending on whether the branch conditions are met or not met so as to immediately execute the selected instruction at cycle t4.

In this example, the branch conditions are met and the RISC microprocessor 34 selects and executes at cycle t4 the first instruction of the two instructions fetched by the branch address BA=(m). In this way, when the branch conditions are met, the program counter in the RISC microprocessor 34 is changed from (n+8) to (m). Further, at cycle t4, the cache memory device 30 receives the data address (third address type DA=(da) based on the load instruction at the cycle t3 from the RISC microprocessor 34 together with the third access required signal DAG. Then, the data address DA is selected as the first selected address SA1 based on the function of the control device 20 indicated in number 4 in table 1, so that desired data is read out from the second dual port memory array 24.

At cycle t5, the RISC microprocessor 34 executes the second instruction of the two instructions fetched by the branch address BA=(m), and the cache memory device 30 receives the instruction address (first address type) IA=(m+8) generated by the increment of the program counter together with the first access requiring signal IAG. Then, the instruction address IA is selected as the first selected address SA1 and the next two instructions are fetched from the dual port memory array 24. At cycle t6, the first instruction of the two instructions fetched at the cycle t5 is executed.

According to the above embodiment, since it is possible to simultaneously fetch the instruction to be executed next where the branch conditions are not met and the instruction to be executed next where the branch conditions are met, the RISC microprocessor 34 can execute instructions successively every cycle regardless of the branch conditions being met or not met (FIG. 4 shows the case where the branch conditions are met). Since the above description is premised on the assumption that the conditions of the conditional branch instruction are met, an execution result of the load instruction fetched with the conditional branch instruction, namely the data read out at the cycle t4 is invalidated in the RISC microprocessor 34.

Figure 5:
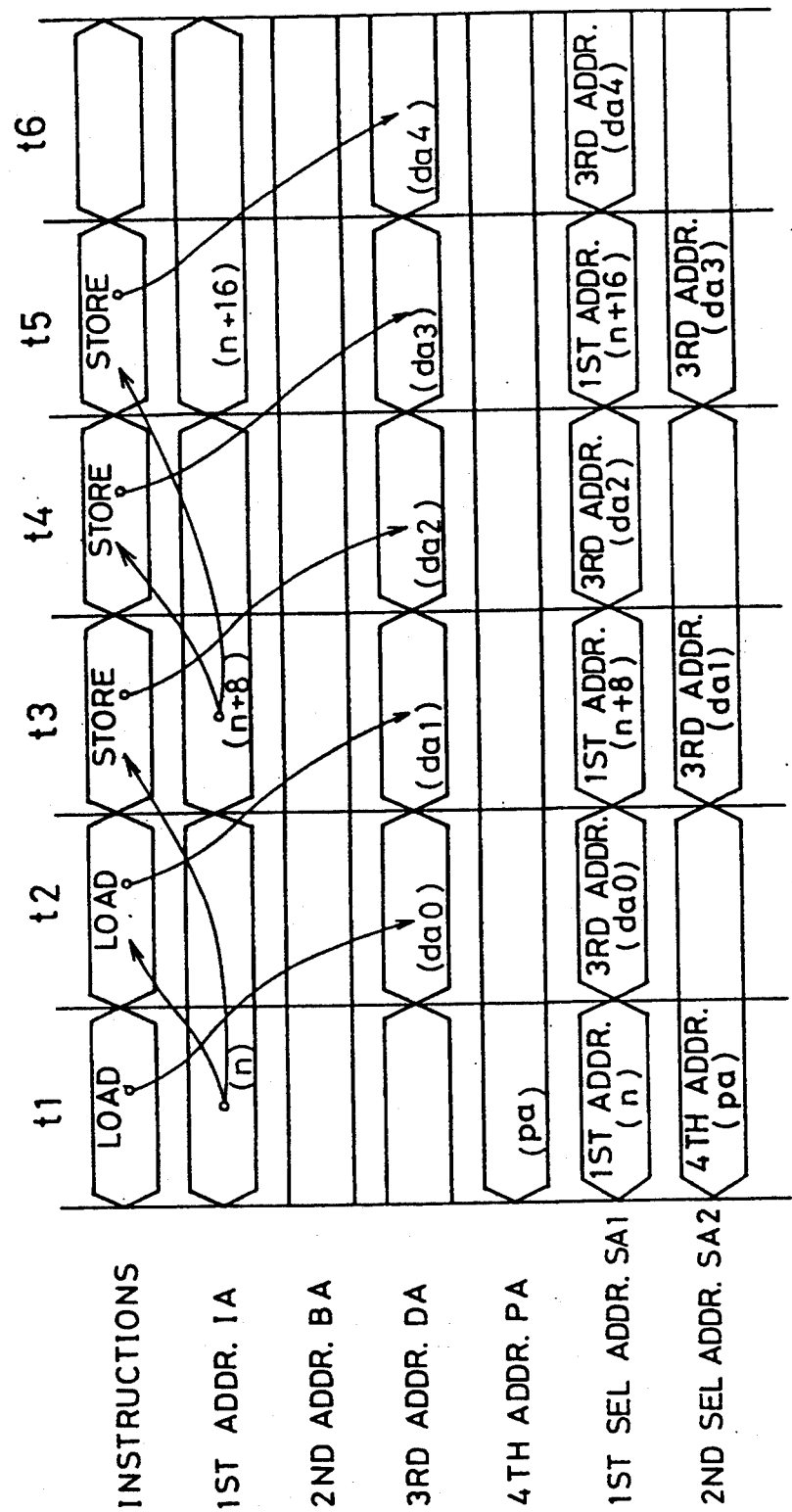

FIG. 5 is a timing chart showing (1) an example of a simultaneous occurrence of the access requirement for the instruction address IA (first address type) and that for physical address PA (fourth address type) (cycle t1) and (2) an example of a simultaneous occurrence of the access requirement for the instruction address IA (first address type) and that for the data address DA (third address type) (cycles t3 and t5).

At cycle t1, the RISC microprocessor 34 executes the load instruction, the memory cache device 30 receives the instruction address (first address type) IA=(n) generated by the increment of the program counter from the RISC microprocessor 34 together with the first access requiring signal IAG. Concurrently therewith, the cache memory device 30 also receives the physical address (fourth address type) PA=(pa) for regulating the data consistency from the bus supervisory device 36 together with the fourth access requiring signal PAG. Then the instruction address IA and physical address PA are selected as the first and second selected addresses SA1, SA2 according to the function of the control device 20 indicated in number 8 in table 1. In other words, in parallel with the fetch of the second instruction to be executed next from the dual port memory array 24, the cache memory device 30 is checked to determine if it retains the data of the physical address PA. In this example, the load instruction and store instruction are fetched by the instruction address IA=(n).

At cycle t2, while the RISC microprocessor 34 executes the load instruction of the two instructions fetched at the cycle t1, the cache memory device 30 receives the data address (third address type). DA=(da0) based on the load instruction at the cycle t1 from the RISC microprocessor 34 together with the third access requiring signal DAG. Then, the data address DA is selected as the first selected address SA1 according to the function of the control device 20 indicated in number 4 in table 1, so that the desired data is read out from the second dual port memory array 24.

At cycle t3, in parallel with the execution of the store instruction of the two instructions fetched at the cycle t1, the cache memory device 30 receives the instruction address (first address type) IA=(n+8) generated by the increment of the program counter and the data address (third address type) DA=(da1) based on the load instruction at cycle t2 from the RISC microprocessor 34 together with the first and third access requiring signals IAG, DAG. Then, the instruction address IA and data address DA are selected as the first and second selected addresses SA1, SA2 according to the function of the control device 20 indicated in number 7 in table 1. In other words, the two instructions to be executed next and the desired data are simultaneously read out from the second dual port memory array 24. In this example, the two stored instructions are fetched by the instruction address IA =( n+8).

At cycle t4, concurrently with the execution of the first store instruction of the two instructions fetched at the cycle t3 by the RISC microprocessor 34, the cache memory device 30 receives the data address (third address type) DA=(da2) based on the store instruction at the cycle t3 from the RISC microprocessor 34 together with the third access requiring signal DAG. Then, the data address DA is selected as the first selected address SA1, so that the desired data is written into the second dual port memory array 24.

At cycle t5, in parallel with the execution of the second store instruction of the two instructions fetched at the cycle t3, the cache memory device 30 receives the instruction address (first address type) IA=(n+16) and the data address (third address type) DA=(da3) based on the store instruction at the cycle t4 simultaneously from the RISC microprocessor 34 together with the first and third access requiring signals IAG, DAG. Then, the instruction address IA and the data addresses DA are selected as the first and second selected address SA1, SA2 respectively, so that the two instructions to be executed next are fetched from the second dual port memory array 24, simultaneously with writing of the desired data into the second dual port memory array 24.

At cycle t6, the cache memory device 30 receives the data address (third address type) DA−(da4) based on the store instruction at the cycle t5 from the RISC microprocessor 34 together with the third access requiring signal DAG. Then, the data address DA is selected as the first selected address SA1, so that the desired data is written into the second dual port memory array 24.

In this embodiment, as described above, since it is possible to process simultaneously the access requirement for the instruction address IA and that for the physical address PA for applying to the multiprocessor, the penalty is reduced, compared with the conventional cache memory arrangements. Further, since the simultaneous processing of the access requirement for the instruction address IA and that for the data address DA is possible, the instruction fetch and data access can be performed without penalty as far as the cache memory device 30 hits, even when the RISC microprocessor 34 executes successive memory access instructions (load instruction and store instruction).

Figure 6:
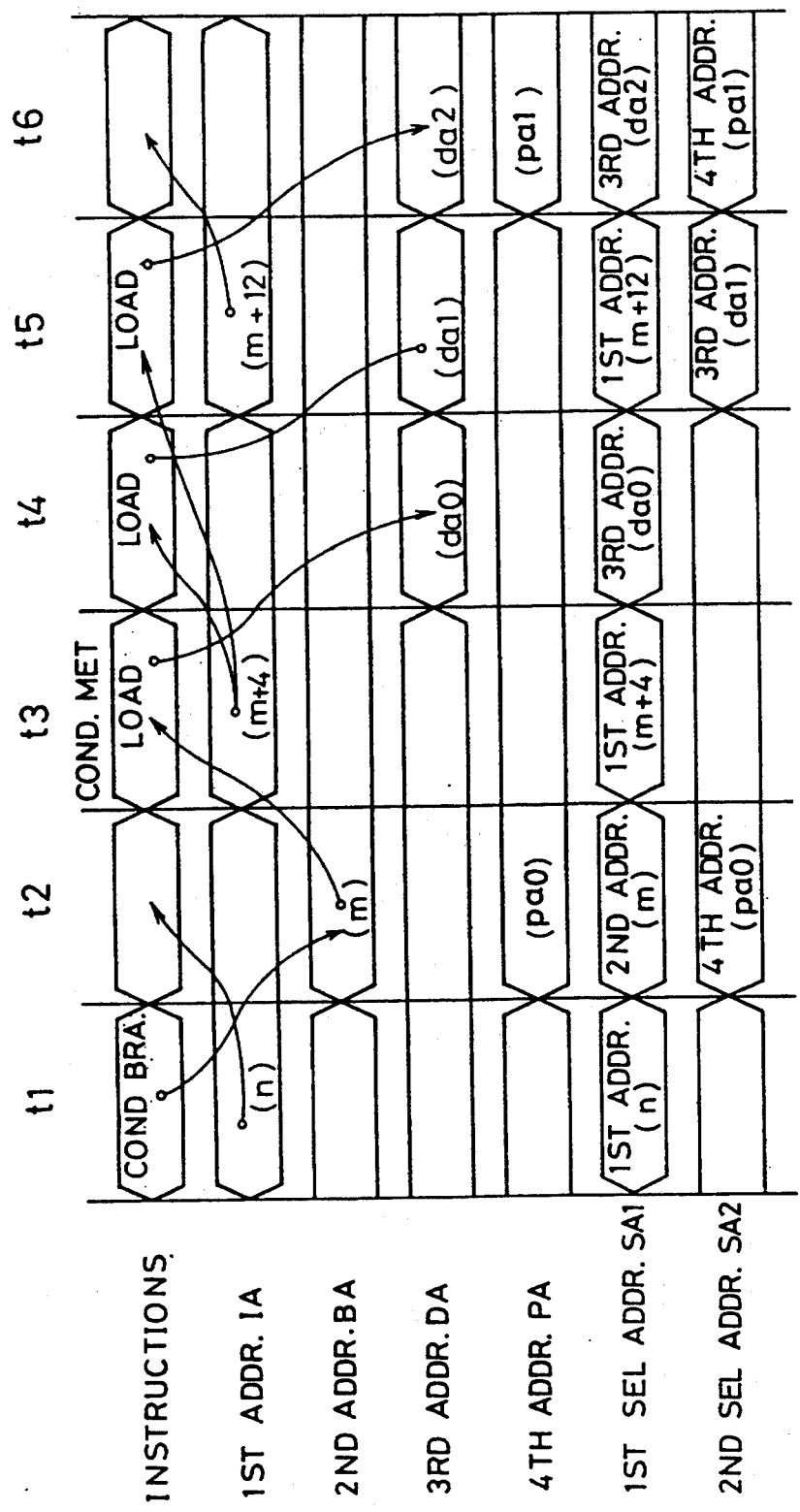

FIG. 6 is a timing chart showing three examples of (1) simultaneous occurrence of the access requirement for the branch address (second address type) BA and that for the physical address (fourth address type) PA (cycle t2), (2) simultaneous occurrence of the access requirement for the instruction address (first address type) IA and that for the data address (third address type) DA (cycle t5), and (3) simultaneous occurrence of the access requirement for the data address (third address type) DA and that for physical address (fourth address type) PA (cycle t6) .

At cycle t1, the RISC microprocessor 34 executes the conditional branch instruction, the cache memory device 30 receives the instruction address (first address type) IA=(n) generated by the increment of the program counter from the RISC microprocessor 34 together with the first access required signal IAG. Then, the instruction address IA is selected as the first selected address SA1, so that the two instructions are fetched from the second dual port memory array 24.

At cycle t2, the RISC microprocessor 34 judges whether the conditions of the conditional branch instruction of cycle t1 are met in parallel with the execution of the first instruction of the two instructions fetched at cycle t1, the cache memory device 30 receives the branch address (second address type) Ba=(m) calculated based on the conditional branch instruction from the RISC microprocessor 34 together with the second access requiring signal BAG. Concurrently therewith, the physical address (fourth address type) PA=(pa0) for regulating the data consistency is given to the cache memory device 30 together with the fourth access requiring signal PAG from the bus supervisory device 36. Then, the branch address BA and the physical address PA are selected as the first and second selected addresses SA1, SA2, respectively according to the function of the control device 20 indicated in number 10 in table 1. In other words, in parallel with the fetch of one of the instructions to be executed next when the branch conditions are met from the second dual port memory array 24, the cache memory device 30 is checked to determine whether it retains the data of the physical address PA. Further, since the instruction to be executed next when the branch conditions are not met has been fetched at cycle t1, the RISC microprocessor 34 selects one to be executed next out of the two fetched address instructions according to the branch conditions being met or not met, so as to execute the next selected instruction immediately at cycle t3.

In this example, when the load instruction is fetched by the branch address BA=(m) and the conditions of the conditional branch instruction are met, the RISC microprocessor 34 selects and executes the load instruction at cycle t3. When the branch conditions are met, the program counter in the RISC microprocessor 34 is changed from (n) to (m), then is incremented. Accordingly, the instruction address (first address type IA given to the cache memory device 30 from the RISC microprocessor 34 together with the first access requiring signal IAG at cycle t3 is (m+4). Then, the instruction address IA=(m+4) is selected as the first selected address SA1. The two load instructions are fetched from the second dual port memory array 24 by the first selected address SA1.

At cycle t4, in parallel with the execution of the first instruction of the two instructions fetched at the cycle t3, the cache memory device 30 receives the data address (third address type). DA=(da0) based on the load instruction at cycle t3 from the RISC microprocessor 34 together with the third access requiring signal DAG. Then, the data address DA is selected as the first selected address SA1, so that the desired data is read out from the second dual port memory array 24.

At cycle t5, in parallel with the execution of the second load instruction of the two instructions fetched at cycle t3, the cache memory device 30 receives the instruction address (first address type) IA=(n+12) generated by the increment of the program counter and the data address (third address type) DA=(da1) based on the load instruction at cycle t4 from the RISC microprocessor 34 together with the first and third access requiring signals IAG, DAG. Then, the instruction address IA and the data address DA are respectively selected as the first and second selected addresses SA1, SA2 according to the function of the control device 20 indicated in number 7 in table 1. In other words, the two instructions to be executed next and the desired data are simultaneously read out from the second dual port memory array 24.

At cycle t6, in parallel with the execution of the first instruction of the two instructions fetched at cycle t5, the cache memory device 30 receives the data address (third address type) DA=(da2) based on the load instruction at cycle t5 from the RISC microprocessor 34 together with the third access requiring signal BAG. Concurrently therewith, the cache memory device 30 also receives the physical address (fourth address type) PA=(pa1) for regulating the data consistency from the bus supervisory device 36 together with the fourth access requiring signal PAG. In this case, the data address DA and the physical address PA are respectively selected as the first and second selected signals SA1, SA2 according to the function of the control device 20 indicated in number 11 in table 1. In other words, in parallel with the read-out of the desired data from the second dual port memory array 24, the cache memory device 30 is checked to determine whether it retains the data of the physical address PA.

According to the embodiment, as described above, the simultaneous processing of the access requirement for the branch address BA and that for the physical address PA and the simultaneous processing of the access requirement for the data address DA and that for the physical address PA are made possible, thus reducing the penalty compared with the conventional cache memory arrangement. Since the above description is premised on the assumption that the conditions of the conditional branch instruction are met, the execution result of the instruction at cycle t2 is invalidated in the RISC microprocessor 34.

Figure 7:
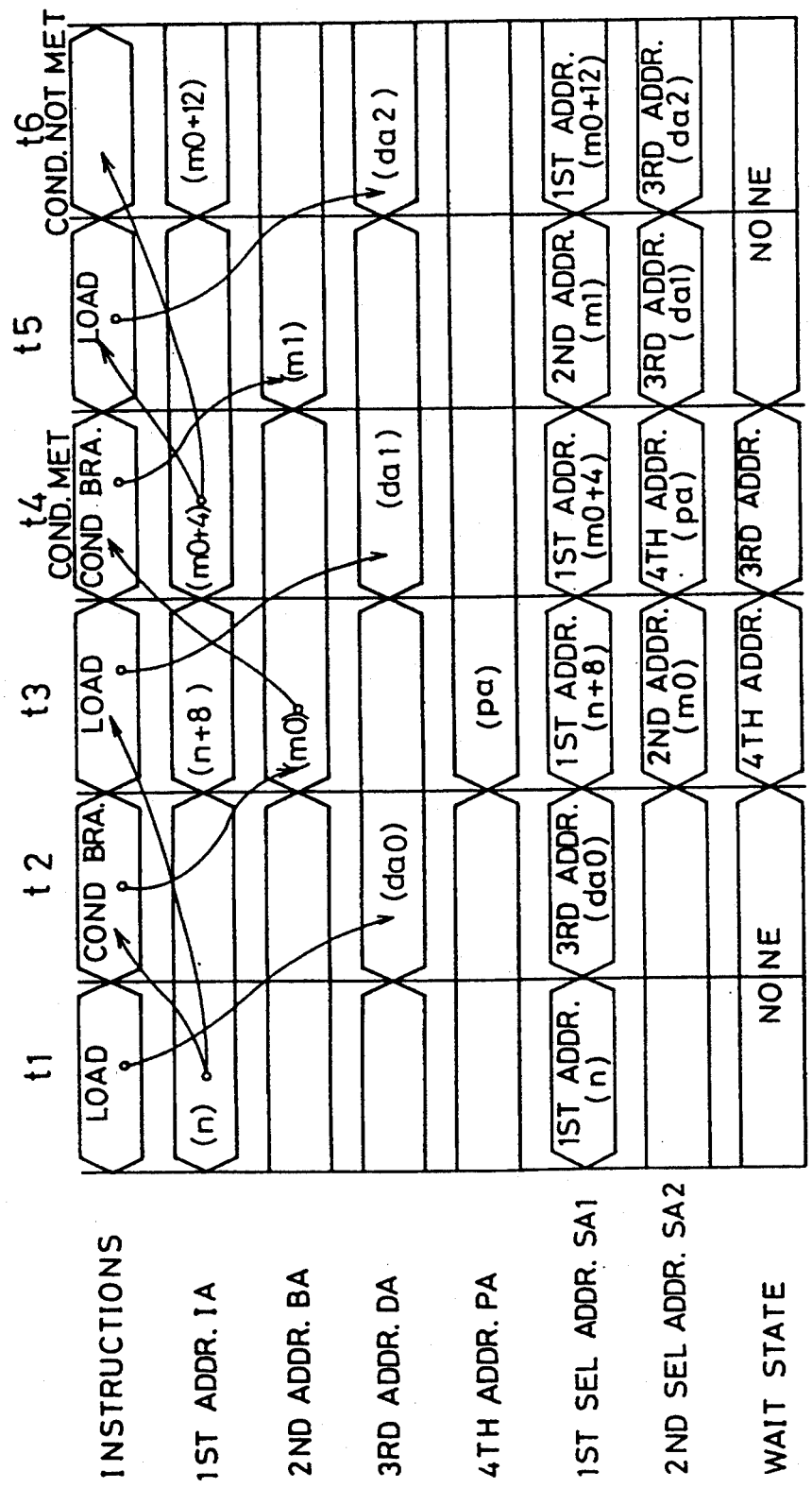

FIG. 7 is a timing chart showing examples of (1) a simultaneous occurrence of three access requirements of the instruction address (first address type), IA, branch address (second address type) BA and the physical address (fourth address type) PA (cycle t3) and (2) a simultaneous occurrence of two access requirements of the instruction address (first address type) IA and the data address (third address type) DA in addition to the access requirement for the physical address (fourth address type) PA in the wait state (cycle t4). Further, FIG. 7 shows examples of (3) a case where the access requirement for the branch address (second address type) BA and that for the data address (third address type) DA are simultaneously given (cycle t5) and (4) a simultaneous occurrence of the access requirement for the instruction address (first address type) IA and that for the data address (third address type) (cycle t6).

At cycle t1, during the execution of the load instruction by the RISC microprocessor 34, the cache memory device 30 receives the instruction address (first address type) IA=(n) generated by the increment of the program counter from the RISC microprocessor 34 together with the first access requiring signal IAG. Then, the instruction address IA is selected as the first selected address SA1, so that the two instructions are fetched from the second dual port memory array 24. At this time, the conditional branch instruction and load instruction are fetched.

At cycle t2, while the RISC microprocessor 34 executes the conditional branch instruction of the two instructions fetched at the cycle t1, the cache memory device 30 receives the data address (third address type). DA=(da0) based on the load instruction at the cycle t1 from the RISC microprocessor 34 together with the third access requiring signal DAG. Then, the data address DA is selected as the first selected address SA1, so that the desired data is read out from the second dual port memory array 24.

At cycle t3, the RISC microprocessor 34 judges whether the conditions of the conditional branch instruction at cycle t2 are met in parallel with the execution of the load instruction of the two instructions fetched at cycle t1, the cache memory device 30 receives the instruction address (first address type) IA=(n+8) generated by the increment of the program counter and the branch address (second address type) BA=(m0) calculated based on the conditional branch instruction from the RISC microprocessor 34 together with the first and second access requiring signals IAG, BAG. Concurrently therewith, the cache memory device 30 also receives the physical address (fourth address type) PA=(pa) for regulating the data consistency from the bus supervisory device 36 together with the fourth access requiring signal PAG. In this case, the instruction address IA and branch address BA are respectively selected as the first and second selected addresses SA1, SA2 according to the function of the control device 20 indicated in number 19 in table 2 and the physical address PA is in the wait state. In other words, two instructions to be executed next in case the branch conditions are not met and one instruction to be executed next in case the branch conditions are met are simultaneously fetched from the second dual port memory array 24. Then, the RISC microprocessor 34 selects one of the two fetched address instructions to be executed next according to the branch conditions being met or not met, so as to immediately execute the selected instruction at cycle t4.

In this example, when another conditional branch instruction is fetched by the branch address BA=(Mo0) at cycle t3 and the conditions of the conditional branch instruction at cycle t2 are met, at cycle t4 the RISC microprocessor 34 selects and executes the conditional branch instruction fetched at cycle t3. When the branch conditions are met, the program counter in the RISC microprocessor 34 is changed from (n+8) to (m0), then is incremented. Accordingly, the instruction address (first address type) IA given to the cache memory device 30 from the RISC microprocessor 34 together with the first access requiring signal IAG at cycle t4 is (m0+4). Namely, at cycle t4, in addition to the cache memory device 30 receiving the physical address (fourth address type) PA=(pa) in the wait state at cycle t3 from the bus supervisory device 36 together with the fourth access requiring signal PAG, the cache memory device 30 also receives the instruction address (first address type) IA=(m0+4) and the data address (third address type) DA=(da1) based on the load instruction at cycle t3 from the RISC microprocessor 34 together with the first and third access requiring signals IAG, DAG. In this case, the instruction address IA and physical address PA are respectively selected as the first and second selected address SA1, SA2 according to the function of the control device 20 indicated in number 22 in table 2 and the data address DA is in the wait state. In other words, in parallel with the fetch of the two instructions to be executed next from the second dual port memory array 24, the cache memory device 30 is checked to determine whether it retains the data of the physical address PA. In this example, two instructions of the load instruction and the other instruction are fetched by the instruction address IA=(m0+4).

At cycle t5, the RISC microprocessor 34 judges whether the conditions of the conditional branch instruction at the cycle t4 are met in parallel with the execution of the load instruction of the two instructions fetched at the cycle t4, the cache memory device 30 receives the branch address (second address type) BA=(ml) calculated based on the conditional branch instruction at cycle t4 and the data address (third address type) DA=(da1) in the wait state at cycle t4 from the RISC microprocessor 34 together with the second and third access requiring signals BAG, DAG. Then, the branch address BA and the data address DA are respectively selected as the first and second selected address SA1, SA2 according to the function of the control device 20 indicated in number 9 in table 1. In other words, the desired data is read out from the second dual port memory array 24 simultaneously with the fetch of the two instructions to be executed next where the branch conditions are met. Further, since the instruction to be executed next when the branch conditions are not met has been fetched at cycle t4, the RISC microprocessor 34 can select one of the two fetched address instructions to be executed next according to the branch conditions being met or not met, so as to execute the selected instruction immediately at cycle t6.

In this example, the conditions of the conditional branch instruction at cycle t4 are not met, and the RISC microprocessor 34 selects and executes the second instruction of the two instructions fetched at cycle t4. In this case, at cycle t6, the cache memory device 30 receives the instruction address (first address type) IA=(m0+12) generated by the increment of the program counter and the data address (third address type) DA=(da2) based on the load instruction at cycle t5 from the RISC microprocessor 34 together with the first and third access requiring signals IAG, DAG. Then, the instruction address IA and data address DA are respectively selected as the first and second selected addresses SA1, SA2 according to the function of the control device 20 indicated in number 7 in table 1. In other words, the two instructions to be executed next and the desired data are simultaneously read out from the second dual port memory array 24.

According to the embodiment, as described above, since the instruction address IA for instruction fetch and that for branch address BA are processed prior to the data access requirement for the physical address PA, instructions are supplied to the RISC microprocessor 34 every cycle without obstruction caused by data accesses. Since an access requirement in the wait state at a cycle is processed at the next cycle with priority, there is no more than one cycle penalty of the access requirement. In addition, the simultaneous processing of the access requirement for the branch address BA and that for the data address DA is possible. Since the above description is premised on the assumption that the conditions of the conditional branch instruction at cycle t2 are met, the execution result of the load instruction at cycle t3, i.e., the data read out at cycle t5 is invalidated in the RISC microprocessor 34.

In the above description about the simultaneous processing of the two access requirements with reference to the FIGS. 4–7, there are six address combinations, i.e., (1) instruction address IA and branch address BA, (2) instruction address IA and data address DA, (3) instruction address IA and physical address PA, (4) branch address BA and data address DA, (5) branch address BA and physical address PA and (6) data address DA and physical address PA. The possible combinations are actually only six in the case where the RISC microprocessor 34 executes one instruction per cycle. In the case, for example, where two memory access instructions are simultaneously executed with the RISC microprocessor 34 with an architecture of superscalar type which can simultaneously executes plural instructions in one cycle, however, it is required to simultaneously process the access requirements for two data addresses DA. In so doing, when double third access requirements DAG are given simultaneously, the control device 20 specifies the data address (third address type) DA with the first specifying signal S1 and specifies another data address (third address type) DA with the second specifying signal S2. Further, when four instructions of the instructions stored in the cache memory device 30 are fetched at once by the instruction address (first address type). IA from the RISC microprocessor 34, an access frequency for the instruction address IA decreases, thus performing instruction fetch and data access without penalty as far as the cache memory device 30 hits.

The two cases where three access requirements are simultaneously given are described above with reference to FIG. 7. The combinations of the three access requirements in the two cases are (1) instruction address IA, branch address BA and physical address PA and (2) instruction address IA, data address DA and physical address PA. The other possible combinations of more than three access requirements are (3) instruction address IA, branch address BA and data address DA, (4) branch address BA, data address DA and physical address PA and (5) instruction address IA, branch address BA, data address DA and physical address PA. Wherein the combinations of three access requirements occurs only with a RISC microprocessor 34 with an architecture of superscalar type. The cache memory device 30 in this embodiment executes each combination as indicated in the numbers 12-15, 24-27, table 2.

The access requirements for the first to fourth address types IA, BA, DA, PA occur independently of each other. Therefore, it is possible for the four access requirements to occur simultaneously. Since the average access frequency, however, is lower than two access requirements per cycle, it is enough and logical to simultaneously process only two access requirements.

Conventionally, the cache memory device must supply one instruction per cycle to the RISC microprocessor since the RISC microprocessor successively executes instructions every cycle. In this embodiment, however, since the two instructions are fetched at once from the cache memory device 30, provided that the access frequency of one access per cycle is 100%, the access frequency for instruction address (first address type) shall be 50% (one access per two cycles). A frequency of using a sequence change instruction such as unconditional branch instruction, conditional instruction is about 15%. On the other hand, a memory access instruction in the RISC microprocessor 34 is limited to two kinds, i.e., load instruction and store instruction and a frequency of using the instructions is about 25%. Accordingly, the access frequencies for the branch address (second address type) BA and for the data address (third address type) DA can be estimated respectively to about 15% and 25%. The access frequency for the physical address (fourth address type) PA shall be at the most 100% since the access to the cache memory device 30 by the bus supervisory device 36 does not exceed one per cycle. A total access frequency for each of the first to fourth address types shall be about 190% at the most. Wherein, in case of the cache memory device 30 with, for example, four lines per block, a maximum access frequency by the bus supervisory device 36 is about 20-30% (one access per four cycles), thus the actual total access frequency shall be about 110-120% at the most. Therefore, it is sufficient that only two access requirements are processed simultaneously. Further, according to this embodiment, when four access requirements are given simultaneously, since access requirements in the wait state are processed with priority, the two access requirements in the wait state of the four access requirements are processed next without failure. Thus, the penalty is reduced to only one cycle at any time.

The priority rule that the instruction address (first address type) IA and the branch address (second address type) BA precede the data address (third address type) DA and the physical address (fourth address type) PA and the physical address PA precedes the data address DA can be changed according to the computer system.

Figure 8:
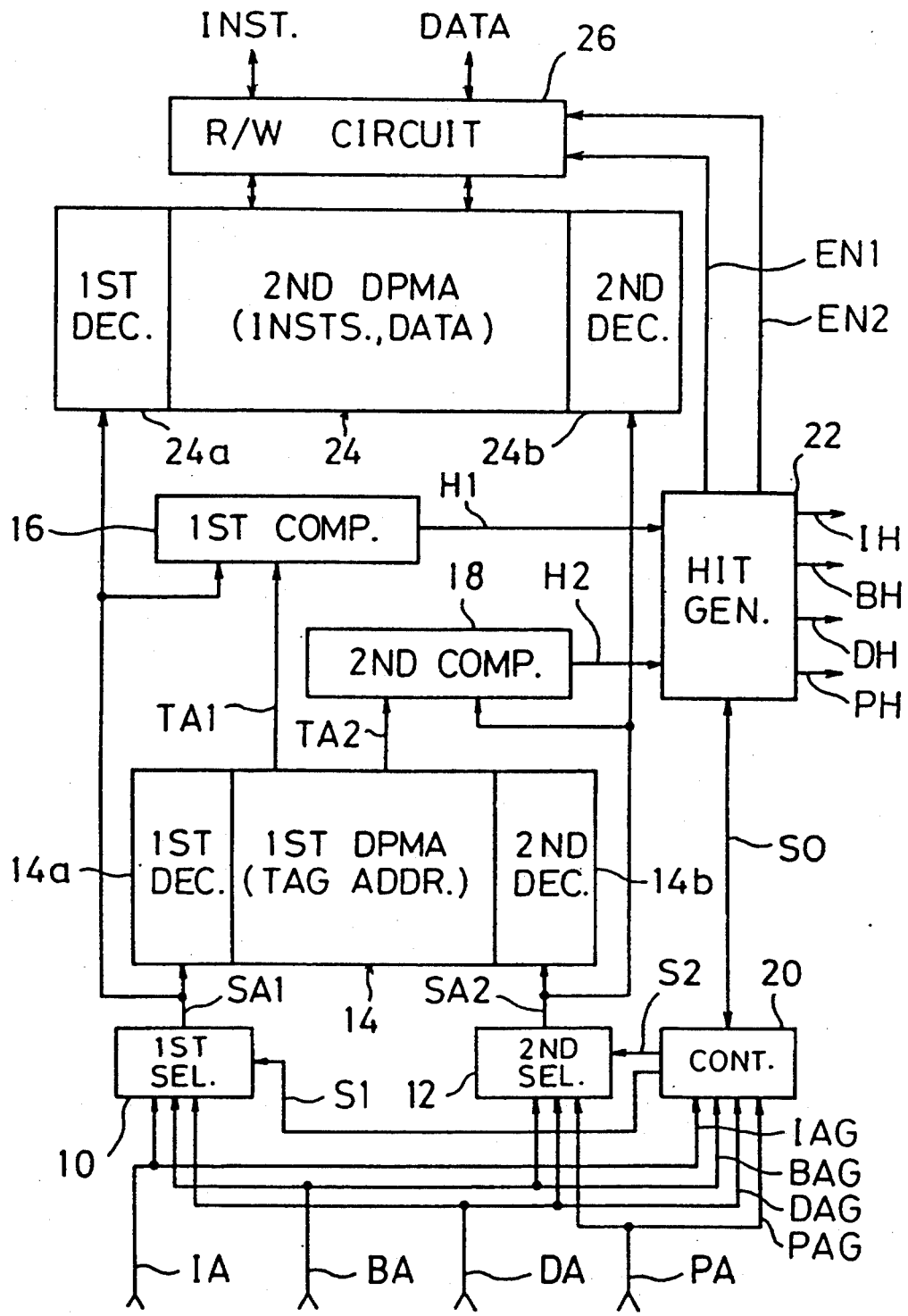
FIG. 8 is a block diagram showing a construction of a cache memory device according to another embodiment of the present invention.

FIG. 8 is a block diagram showing a construction of a cache memory device according to another embodiment of the present invention. In this embodiment, as shown in table 3 and table 4, the control device 20 specifies one address as the first selected address (first specifying signal S1) out of the first to third addresses IA, BA, DA as the access requiring addresses and specifies another address as the second selected address (second specifying signal S2) out of the second to fourth addresses BA, DA, PA as the access requiring addresses. Corresponding thereto, only the instruction address IA, the branch address BA and the data address DA are input to the first address selector 10, and only the branch address BA, the data address DA and the physical address PA are input to the second address selector 12. The other construction is the same as in FIG. 1.

TABLE 3

| No. | INPUT | | | | OUTPUT | |
|---|---|---|---|---|---|---|
| | IAG | BAG | DAG | PAG | S1 | S2 |
| 51 | 0 | 0 | 0 | 0 | — | — |
| 52 | 1 | 0 | 0 | 0 | IA | — |
| 53 | 0 | 1 | 0 | 0 | BA | — |
| 54 | 0 | 0 | 1 | 0 | DA | — |
| 55 | 0 | 0 | 0 | 1 | — | PA |
| 56 | 1 | 1 | 0 | 0 | IA | BA |
| 57 | 1 | 0 | 1 | 0 | IA | DA |
| 58 | 1 | 0 | 0 | 1 | IA | PA |
| 59 | 0 | 1 | 1 | 0 | BA | DA |
| 60 | 0 | 1 | 0 | 1 | BA | PA |
| 61 | 0 | 0 | 1 | 1 | DA | PA |

TABLE 4

| No. | INPUT | | | | OUTPUT | | NEW |
|---|---|---|---|---|---|---|---|
| | IAG | BAG | DAG | PAG | S1 | S2 | WAIT STATE |
| 62 | 1* | 1 | 1 | 0 | IA | BA | DA |
| 63 | 1 | 1* | 1 | 0 | IA | BA | DA |
| 64 | 1 | 1 | 1* | 0 | IA | DA | BA |
| 65 | 1 | 1 | 1 | 0 | IA | BA | DA |
| 66 | 1* | 1 | 0 | 1 | IA | PA | BA |
| 67 | 1 | 1* | 0 | 1 | BA | PA | IA |
| 68 | 1 | 1 | 0 | 1* | IA | PA | BA |
| 69 | 1 | 1 | 0 | 1 | IA | BA | PA |

TABLE 4-continued

| No. | INPUT | | | | OUTPUT | | NEW WAIT STATE |
|---|---|---|---|---|---|---|---|
| | IAG | BAG | DAG | PAG | S1 | S2 | |
| 70 | 1* | 0 | 1 | 1 | IA | PA | DA |
| 71 | 1 | 0 | 1* | 1 | DA | PA | IA |
| 72 | 1 | 0 | 1 | 1* | IA | PA | DA |
| 73 | 1 | 0 | 1 | 1 | IA | PA | DA |
| 74 | 0 | 1* | 1 | 1 | BA | PA | DA |
| 75 | 0 | 1 | 1* | 1 | DA | PA | BA |
| 76 | 0 | 1 | 1 | 1* | BA | PA | DA |
| 77 | 0 | 1 | 1 | 1 | BA | PA | DA |
| 78 | 1* | 1* | 1 | 1 | IA | BA | DA, PA |
| 79 | 1* | 1 | 1* | 1 | IA | DA | BA, PA |
| 80 | 1* | 1 | 1 | 1* | IA | PA | BA, DA |
| 81 | 1 | 1* | 1* | 1 | BA | DA | IA, PA |
| 82 | 1 | 1* | 1 | 1* | BA | PA | IA, DA |
| 83 | 1 | 1 | 1* | 1* | DA | PA | IA, BA |
| 84 | 1* | 1 | 1 | 1 | IA | PA | BA, DA |
| 85 | 1 | 1* | 1 | 1 | BA | PA | IA, DA |
| 86 | 1 | 1 | 1* | 1 | DA | PA | IA, BA |
| 87 | 1 | 1 | 1 | 1* | IA | PA | BA, DA |
| 88 | 1 | 1 | 1 | 1 | IA | BA | DA, PA |

In this embodiment, even though the control device 20 has a limited range for specifying the selected address, all of the six combinations can be specified as the first and second selected addresses: the combinations are (1) instruction address IA and branch address BA, (2) instruction address IA and data address DA, (3) instruction address IA and physical address PA, (4) branch address BA and data address DA, (5) branch address BA and physical address PA and (6) data address DA and physical address PA. It is also possible to specify two data addresses DA, DA for the RISC microprocessor 34 with an architecture of superscalar type. Further, the same operation as the embodiment in FIG. 1 is possible even in case with three access requirements. In other words, a construction of the hardware can be simplified, obtaining the same effects as in the embodiment of the FIG. 1.

I claim:

1. A cache memory device capable of simultaneously processing a plurality of addresses from an address group composed of plural addresses to be used for instruction fetch and plural addresses to be used for data fetch, comprising:

an address selecting means for selecting plural instruction addresses, plural data addresses, or plural instruction addresses and data addresses from a plurality of access requiring addresses simultaneously received from a microprocessor; and a memory means storing instructions and data, said memory means being independently accessed by each of said selected plural instruction addresses, plural data addresses, or plural instruction and data addresses from said address selecting means.

2. A cache memory device which processes one or more addresses belonging to an address group as access requiring addresses, the address group being composed of four types of addresses; an instruction address as a first type of address successively generated by an increment of a program counter for instruction fetch, a branch address as a second type of address generated for instruction fetch in a branch target based on a sequence change instruction requiring a sequence change of an instruction execution, a data address as a third type of address generated for data access based on a memory access instruction and a physical address for data access as a fourth type of address for regulating a data consistency between said cache memory device and other memory devices, said cache memory device comprising:

a control device for specifying two addresses as first and second selected addresses respectively out of said access requiring addresses when access requiring addresses are simultaneously received from a microprocessor and a bus snoop;

a first address selector for selecting an address specified as the first selected address by said control device out of said access requiring addresses and for outputting the first selected address;

a second address selector for selecting an address specified as the second selected address by said control device out of said access requiring addresses and for outputting the second selected address; and a memory device storing tag addresses, instructions and data, said memory device being accessed simultaneously by said first and second address selectors.

3. A cache memory device according to claim 2, wherein said control device specifies the first selected address out of the first to third types of addresses, and specifies the second selected address out of the second to fourth types of addresses.

4. A cache memory device according to claims 2 or 3, wherein said control device specifies the first and second selected addresses according to a priority rule, said priority rule requiring that the first and second type of addresses be processed prior to the third and fourth type of addresses and the fourth type of address be processed prior to the third type of address, said control device places an access requiring address other than the addresses specified as the first and second selected addresses in a wait state.

5. A cache memory device according to claim 4, wherein said control device processes said access requiring address in the wait state prior to first and second selected addresses where two or more access requiring addresses are simultaneously received when there is an access requiring address in the wait state.

6. A cache memory device according to claims 2 or 3, wherein said cache memory device comprises:

a first dual port memory array storing tag addresses and having first and second independent ports, in which a first tag address is read out from said first port by a specific part of the first selected address output from said first address selector and a second tag address is read out from said second port by a specific part of the second selected address output from said second address selector;

a first comparator for outputting a first hit signal when another specific part of the first selected address output from said first address selector conforms with the first tag address read out from said first port of said first dual port memory array;

a second comparator for outputting a second hit signal when another specific part of the second selected address output from said second address selector conforms with the second tag address read out from said second port of said first dual port memory array; and a second dual port memory array storing instructions and data and having first and second independent memory ports, wherein said second dual port memory array is accessed via said first memory port by the first selected address output from said first address selector when the first comparator outputs the first hit signal, and said second dual port memory array is accessed via said second memory port by the second selected address output from said second address selector when said second comparator outputs the second hit signal.

7. A cache memory device according to claims 2 or 3, wherein at least two successive instructions of the stored instructions are fetched at once from said cache memory device for every access by said first selected address.

8. A cache memory device which processes one or more access requiring addresses belonging to an address group, the address group being composed of four types of addresses; an instruction address as a first type of address successively generated by an increment of a program counter for instruction fetch, a branch address as a second type of address generated for instruction fetch in a branch target based on a sequence change instruction requiring a sequence change of an instruction execution, a data address as a third type of address generated for data access based on a memory access instruction, and a physical address for data access as a fourth type of address for regulating data consistency between said cache memory device and other memory devices, said cache memory device comprising:

a control device for specifying a first selected address and a second selected address, respectively, from said access requiring addresses when more than one access requiring address is simultaneously received from a microprocessor and a bus snoop, said first selected address selected from three of said four types of addresses, and said second selected address selected from three of said four types of addresses;

a first address selector for selecting an address specified as the first selected address by said control device out of said access requiring addresses and for outputting the first selected address;

a second address selector for selecting an address specified as the second selected address by said control device out of said access requiring addresses and for outputting the second selected address; and a memory device storing tag addresses, instructions and data, said memory device being accessed simultaneously and independently by said first and second address selectors.

* * * * *

UNITED STATES PATENT AND TRADEMARK OFFICE
CERTIFICATE OF CORRECTION

PATENT NO. : 5,434,989
DATED : July 18, 1995
INVENTOR(S) : Seiji Yamaguchi

It is certified that error appears in the above-indentified patent and that said Letters Patent is hereby corrected as shown below:

Title Page, Abstract, Line 5: "instructions" should read --instruction--.

Column 1, Line 5: "continuation divisional" should read --continuation--.

Column 2, Line 13: "Archibanld" should read --Archibald--.

Column 4, Line 38: "for" should read --(for--.

Column 5, Line 25: "type" should read --types--.

Column 5, Line 60: "Output" should read --output--.

Column 8, Line 58: "Hi" should read --H1--.

Column 9, Line 36: "type)." should read --type)--.

Column 10, Line 57: "type" should read --type)--.

Column 11, Line 53: "type)." should read --type)--.

Column 13, Line 13: "Ba=(m)" should read --BA=(m)--.

Column 13, Line 43: "type" should read --type)--.

Column 13, Line 54: "type)." should read --type)--.

Column 15, Line 2: "type)." should read --type)--.

UNITED STATES PATENT AND TRADEMARK OFFICE
CERTIFICATE OF CORRECTION

PATENT NO. : 5,434,989
DATED : July 18, 1995
INVENTOR(S) : Seiji Yamaguchi

It is certified that error appears in the above-indentified patent and that said Letters Patent is hereby corrected as shown below:

Column 15, Line 40: "BA=(MoO)" should read —BA=(moO)—.

Column 17, Line 43: "table 2." should read —28-38 in table 2.—.

Signed and Sealed this

Twenty-sixth Day of November 1996

Attest:

BRUCE LEHMAN

Attesting Officer      Commissioner of Patents and Trademarks